Patented Nov. 9, 1937

2,098,784

UNITED STATES PATENT OFFICE 2,098,784

BAKING UTENSIL

Herbert J. Krause, Huntington, and Paul R. Simmons, Marion, Ind., assignors, by direct and mesne assignments, to Simmons Paper Products, Inc., Warsaw, Ind., a corporation of Indiana No Drawing. Application September 9, 1935, Serial No. 39,730

2 Claims. (Cl. 53—6)

This invention relates to a baking utensil and more particularly to a coated paper receptacle suitable for use in the baking and subsequent retension of the baked article, such as a pie.

The article of this invention is a baking plate of coated paper stock which will not affect the article while baking and which will not deform in the baking and which, following the baking of the article, is not unattractive, since the pies are retained in the plates until consumed or in the case of pies larger than individual pies, pieces thereof are removed for consumption.

A baking plate of the character indicated is prepared by suitably applying to the article receiving surface of the receptacle stock, a coating which is relatively inexpensive and is nondeleterious and which has all the advantages before mentioned.

Usually, individual plates are 4", 5" or 6" in diameter and include a bottom, which may be annularly corrugated or non-corrugated, an inclined side, radially or spirally scored or plain, and an outwardly and sometimes downwardly directed rim. Plates for baking full size pies are of this same character but 8" or more in diameter and usually have one or more concentric corrugations in the bottom.

Uncoated or standard paper plates when used for baking pies, impart to the pie crust a foul or objectionable taste.

All of these forms of paper plates are well known in the industry and require no illustration.

Also, paper plates, as is well known in the art, may be of other than circular outline as, for example, square.

The following composition has been found satisfactory for transforming a paper plate, suitable in conformation for pie and like baking, into a baking plate.

By baking it is not intended to restrict the invention to the baking of pies, et cetera, because this baking plate is also suitable for use in oven warming of substantially all foods, although there may be an exception or two to this generalization.

Grease containing articles, fruit acid containing articles and like, have been tested and the baking plate found satisfactory, that is, there results no loss of form and substantially little or no absorption and there appears to be no reaction with the article or if any, it is so slight as not to be noticeable and it is not deleterious.

One example of the composition applied as a coating, which is recited by way of illustration only, is a mixture of water, preferably distilled, citric or tartaric acid or a suitable equivalent material and sodium or potassium silicate or a suitable equivalent thereof.

When three specific ingredients, distilled water, sodium silicate and citric acid are used, the material is liquid and has a milky appearance. Upon application to the paper surface, it turns the latter to a light yellow color. Upon subjection to baking temperatures, the color changes to a golden brown. However, if a pie is baked therein, the color is a darker brown and the pie does not adhere or stick to the plate but may be readily removed therefrom, as an entirety or as a cut.

The approximate proportions of the ingredients mentioned are water 32 oz., citric acid 1¼ oz. plus 94 grains and 96 oz. of 42° Bé. sodium silicate solution.

These amounts produce approximately one gallon of coating material.

The appearance of the coated surface prior to baking is glass like.

Pies satisfactorily baked in these baking plates have been plum, peach, apply, blackberry, raspberry, apricot, prune and chocolate custard pies.

The baking plates of this invention have been subjected to carbon tetrachloride, ether, dilute hydrochloric acid, amyl acetate, "Zonite" and paraffin and these did not pass through the coating nor through the plate so as to be exposed on the opposite side, thus demonstrating the resistance of the coating to a variety of materials.

It has been determined that the anhydrous and hydrous forms of citric acid serve satisfactorily.

In further explanation of the problem solved by this invention, it may be said that baking in a non-coated paper plate will dry out the crust, and the shortening instead of going into the pie body and/or crust saturates the plate to give it an unsatisfactory (unsavory) appearance and the plate flattens out, forming a flat pie that is not what the purchasing public is accustomed to.

Pies baked in the baking plates of this invention are usually better than pies baked in metal plates because in a pie bakery, where the pans are repeatedly used for each day's run (it takes 10 to 20 minutes to bake a pie), the surface of the pan acquires a rancid coating which is not removable except under extreme care—that is, at the end of the day's run. The paper baking plate insures uniformity of taste in all pies because the plate is used but once. Also, the plate attains an attractive color which is caramel-like. Baking instead of weakening or flattening the plate actually stiffens it and the longer it is baked, the stiffer it becomes. Whereas, the use of untreated plates results in pies sticking therein, following baking, the use of this coated baking plate prevents sticking.

Several methods of applying the coating to the interior surface of the paper plate have been utilized, to wit, spraying, brushing, daubing and the like. Dipping, resulting in coating both sides, has been practiced but the cost of complete coverage is commercially excessive.

The invention claimed is:—

1. A baking utensil comprising a plate consisting of paper stock of absorptive properties having on its inner face only a glass-like continuous coating of the dried residue of a solution of an alkali metal silicate and an acid selected from the group consisting of citric and tartaric acids.

2. A baking utensil comprising a plate consisting of paper stock of absorptive properties having on its inner face only a glass-like continuous coating comprising a dried residue of a water soluble silicate composition, said coating when subjected to baking temperatures turning a golden brown.

HERBERT J. KRAUSE.
PAUL R. SIMMONS.